United States Patent [19]

Mäkinen

[11] Patent Number: 5,764,700
[45] Date of Patent: Jun. 9, 1998

[54] DIGITAL RADIO LINK SYSTEM AND RADIO LINK TERMINAL

[75] Inventor: Jarmo Mäkinen, Espoo, Finland

[73] Assignee: Nokia Telecommunications Oy, Espoo, Finland

[21] Appl. No.: 619,702

[22] PCT Filed: Sep. 22, 1994

[86] PCT No.: PCT/FI94/00426

§ 371 Date: Jun. 28, 1996

§ 102(e) Date: Jun. 28, 1996

[87] PCT Pub. No.: WO95/08874

PCT Pub. Date: Mar. 30, 1995

[30] Foreign Application Priority Data

Sep. 24, 1993 [FI] Finland ............... 934196

[51] Int. Cl.⁶ ............... H04B 1/44; H04L 5/14; H04L 27/10

[52] U.S. Cl. ............... 375/272; 375/219; 370/280; 455/78; 455/84

[58] Field of Search ............... 375/219, 222, 375/223, 271, 279, 272, 273, 302, 303; 370/280, 294; 455/78, 84, 86, 110

[56] References Cited

U.S. PATENT DOCUMENTS 3,219,931  11/1965  Lennon, III et al. ............... 455/84
5,020,076  5/1991   Cahill et al. ............... 375/216
5,319,799  6/1994   Morita ............... 455/78

FOREIGN PATENT DOCUMENTS

| 514 200 | 11/1992 | European Pat. Off. . |
|---|---|---|
| 521 238 | 1/1993 | European Pat. Off. . |
| 597 534 | 5/1994 | European Pat. Off. . |
| 625 831 | 11/1994 | European Pat. Off. . |
| 31 29 002 | 2/1983 | Germany . |
| 357069939 | 4/1982 | Japan . |
| 404341026 | 11/1992 | Japan . |
| WO 84/00455 | 2/1984 | WIPO ............... H04B 1/56 |

*Primary Examiner*—Stephen Chin
*Assistant Examiner*—Jeffrey W. Gluck
*Attorney, Agent, or Firm*—IP Group of Pillsbury Madison & Sutro LLP

[57] ABSTRACT

A radio link system in which a fixed radio connection is established between two radio link terminals. The radio link terminals transmit alternately at the same radio frequency. Each of the radio link terminals includes (a) a baseband modulator in the transmitting branch for generating baseband modulation signals from a digital data stream; (b) a demodulator in the receiving branch for generating a baseband data stream by demodulating baseband signals to be received; (c) a common quadrature mixer and a local oscillator for forming an RF transmitting signal directly from the baseband modulation signals to be received directly from the RF signal to be received; and (d) a timer for connecting the radio link terminal alternately to a transmitting and receiving mode. The transmitting and receiving branches are separated at the baseband.

8 Claims, 3 Drawing Sheets

1

DIGITAL RADIO LINK SYSTEM AND RADIO LINK TERMINAL

BACKGROUND OF THE INVENTION

This application claims benefit of international application PCT/FI94/00426, filed Sep. 22, 1994.

The invention relates to a radio link system and to a radio link terminal.

A radio link system usually operates on the duplex principle, which means that two radio link terminals establish together a two-way connection so that the traffic propagates in both directions simultaneously.

A two-way simultaneous connection is established by using a different radio frequency in the outbound and inbound directions. This, however, causes certain problems, which will be discussed under the following points A to D:

A. In both of the radio link terminals, the transmitter and receiver signals have to be separated from each other so that the receiver will not be overloaded. In practice, the only way to accomplish this objective is to use a band division filter (antenna branching unit), which connects the transmitter at one frequency band and the receiver at another frequency band to the antenna. This kind of filter is a very complicated component and thus also is expensive.

B. An antenna branching unit requires either channel-associated tuning or tuning that covers only a frequency range portion, which complicates the manufacture of both the filter itself and its spare parts.

C. As the equipment at the ends of a radio hop are reverse to each other with respect to frequencies, it is difficult to make them similar in structure. At least, it is necessary to modify the antenna branching unit with respect to the reversed transmitting and receiving frequencies, but the radio parts themselves may need to be varied in accordance with the reversed frequencies.

D. As the transmitter and the receiver of the radio link terminal operate at different frequencies, they contain several oscillators operating at different frequencies and possibly causing interfering mixing results within the radio link terminal.

The following ways, among others, have been used in an attempt to solve the problems described above (references A to D correspond to the points set forth above):

A. In the case of a digital radio link, the band division filter (antenna branching unit) is used all the time, and it has been possible to reduce its high cost mainly only in ways relating to the manufacturing technique. In certain applications, e.g., in a wireless telephone system described in PCT Application WO 84/00455, the duplex operation has been achieved by the use of a single channel where communication takes place alternately in both directions at a rate higher than the normal rate. The rates can be evened out by a suitable elastic buffer, and the antenna branching unit can be replaced with a less expensive switch.

B. and C. The antenna branching unit is replaced in the same way as set forth above under item A.

D. The receiver can be made such that it operates on the principle of direct conversion, so that the number of frequency-selective parts and disadvantageous mixing results diminishes. The wireless telephone system disclosed in the above-mentioned PCT Application WO 84/00455 also employs direct conversion.

SUMMARY OF THE INVENTION

The object of the present invention is to avoid the above-described disadvantages and at the same time provide a radio link terminal and radio link system which can be realized as economically as possible, i.e., with a minimal number of parts while the link terminals are also as similar as possible.

The idea of the invention is to apply alternate communication at a single frequency to the radio link system while the transmitter employs direct modulation to a radio frequency and the receiver employs direct conversion from the radio frequency to the baseband so that (a) the transmission and reception use a single common quadrature mixer which is controlled by means of one and the same local oscillator, and (b) the transmitting and receiving branches are separated at the baseband.

In principle, the system according to the invention contains no high-frequency frequency-selective parts, such as an antenna branching unit. The link terminal or link system according to the invention does not either contain any separate high-frequency switches, but these can be replaced with an inexpensive baseband switch. In addition, less tuning is required. Savings in costs will be considerable as the transmitter and the receiver of the radio link terminal share the same mixer and local oscillator. As the transmitter and receiver both operate on the principle of direct modulation/conversion and alternate at the same frequency, there is no risk of disadvantageous mixing results occurring between the transmitter and the receiver.

As the system according to the invention does not use two channels but a single channel twice as broad, the spectral efficiency will, in principle, not change. Alternation between transmission and reception, however, requires a predetermined recovery time, which, in practice, deteriorates the spectral efficiency to some extent.

BRIEF DESCRIPTION OF THE DRAWINGS

In the following, the invention and its preferred embodiments will be described more fully with reference to the examples shown in the attached drawings, wherein.

DETAILED DESCRIPTION

The radio link system according to the invention applies alternate communication at a single frequency to a digital radio link connection transmitting two-way traffic (such as speech and/or data) of at least 0.7 Mbit/s by using direct modulation to the radio frequency in the transmitter and direct demodulation from the radio frequency to the baseband in the receiver. The radio link terminal according to the invention comprises a single quadrature mixer and a single (high-frequency) local oscillator which acts alternately as the local oscillator of the transmitter and the receiver.

Figure 1:
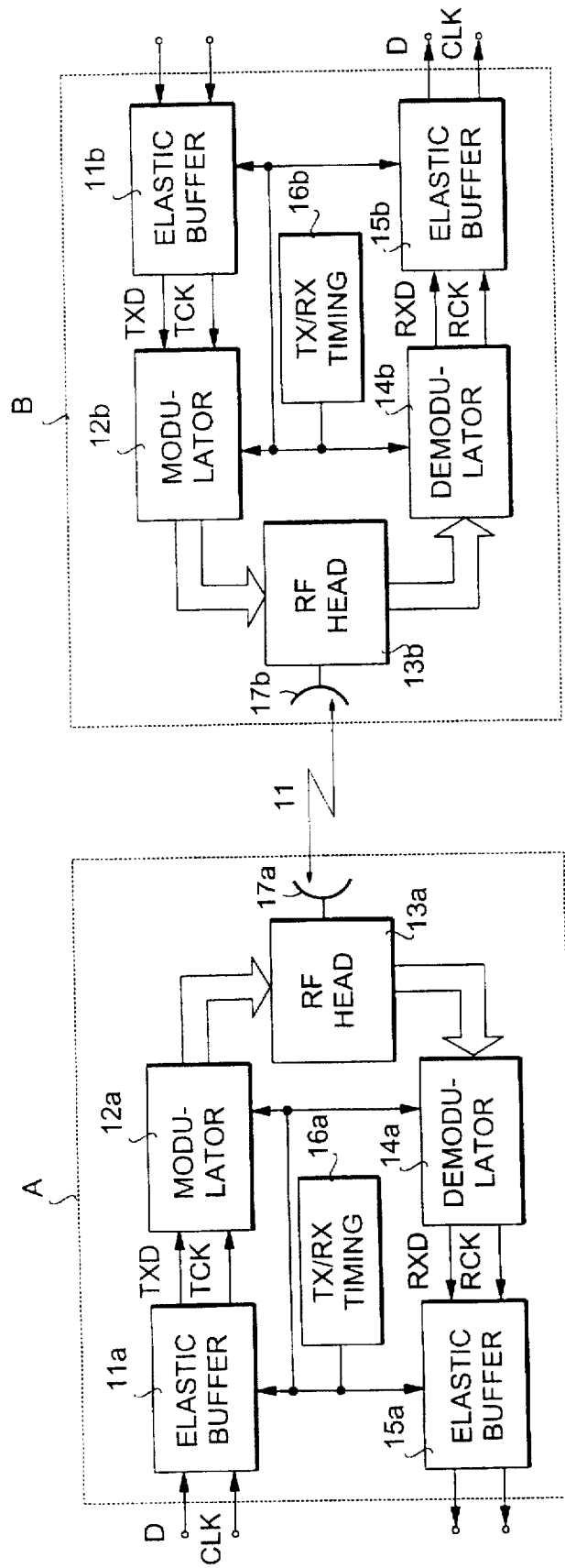
FIG. 1 is a block diagram illustrating a radio link system according to the invention.

FIG. 1 shows a block diagram illustrating the radio link system according to the invention. The system comprises two radio link terminals, A and B, which communicate with each other over a radio path 11. (In FIG. 1, the corresponding parts have been indicated with the same reference numerals in such a way, however, that the letter a is inserted after the reference numeral for radio link terminal A, and the letter b for radio link terminal B.) The transmitting branch of the link terminal comprises an elastic buffer 11, which receives a digital data stream D addressed to the link; and a baseband modulator part 12, which generates a baseband modulation signal for a radio part 13 connected to an antenna 17, the radio part being common to the receiving branch and the transmitting branch. The receiving branch of the link terminal comprises a demodulator 14, which demodulates the baseband modulation signal from the antenna and the radio part; and an elastic buffer 15, which forwards the digital data stream received via the link. The link terminal further comprises a timing unit 16, which causes the link terminal to alternate between the transmitting and receiving modes by controlling the modulator, the demodulator, and the elastic buffers. Both of the link terminals transmit and receive at the same frequency f.

The baseband data stream D entering the link terminal A is applied to the elastic buffer 11a, into which the bits to be transmitted are stored at an even rate. (Storing into the buffer takes place at a sync determined by an incoming clock signal CLK). When the transmission period of the link terminal A starts, the elastic buffer transmits the stored bits, framed in a suitable way, at a rate more than twice the storing rate through the modulator 12a, the radio part 13a, and the antenna 17a, to the opposite end of the radio hop. (In the figure, the framed data stream to be transmitted is indicated with reference TXD and the respective clock signal with reference TCK.) At the opposite end of the radio hop, the received signal passes through the antenna 17b and the radio part 13b to the demodulator 14b, which performs demodulation (makes a decision on the received bits) and applies the bits into the elastic buffer 15b. (In the figure, the received framed data stream is indicated with the reference RXD, and the respective clock signal with the reference RCK.) The elastic buffer disassembles the frame structure of the radio link, and the bits are retrieved at an even rate. In the reverse direction (from terminal B to terminal A), the operation is similar but it alternates in the time domain with the first-mentioned transmitting direction.

Transmitting and receiving periods alternate at an even rate, and speed differences between the bit streams are evened out by conventional techniques. A predetermined recovery period is needed between the transmitting and receiving periods to give the equipment time to set and to cover the propagation times of signals and echoes propagating on the radio path. The gross bit rate is thus clearly more than twice as high as the net bit rate.

Figure 2:
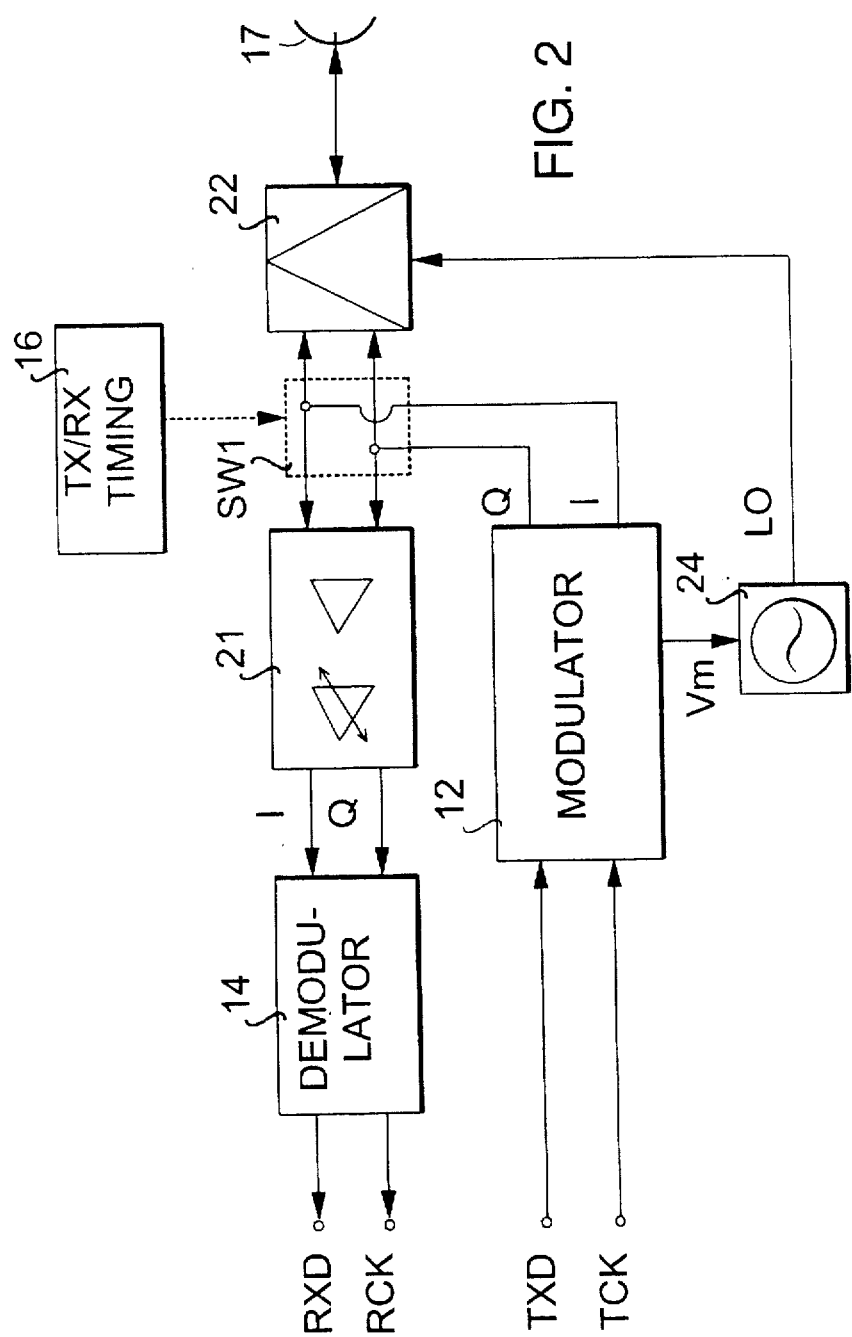
FIG. 2 is a more detailed block diagram illustrating a portion of a radio link terminal according to the invention.

FIG. 2 shows more closely the radio link terminal according to the invention. For the sake of clarity, the elastic buffers 15 are not shown. According to the invention, the radio part 13 comprises a single quadrature-type mixer 22 and a local oscillator 24 controlling it.

During the receiving period of the link terminal, a signal to the antenna 17 is mixed to the baseband in the quadrature-type mixer 22, to the local oscillator input of which a signal LO from the local oscillator 24 is applied. Mutually substantially quadrature baseband signals I and Q obtained from the mixer are passed through baseband amplifiers 21 to the demodulator 14, which makes the decision on the received bits and combines the signals into a single data stream RXD. The baseband amplifiers 21 also contain lowpass filters determining the frequency selectivity of the receiver and possibly also equalizers.

Upon transition to transmission after a reception period, the baseband amplifiers 21 are disconnected from the mixer, and a signal from the modulator 12 is applied to the I and Q ports of the mixer, the shape of the signal depending on the modulation applied. (Generally speaking, the modulator performs the required baseband processing, including the division of the data stream TXD into two portions (I and Q), encoding, filtering, and conversion of the data into analog form.) The disconnection of the baseband amplifiers, however, is optional, as transmission and reception take place at different times, and so signals received during the transmission period are of no importance. Logically, however, there is a switch SW1 between the mixer and the baseband amplifier. If the switch is also implemented physically, this can be done, e.g., by an analog FET switch of the model 4052 or 4066. From the point of view of the invention, however, it is essential that the transmission and reception branches be separated at the baseband.

If the link utilizes PSK- or QAM-type modulation, voltages corresponding to these are applied from the modulator 12 as the I and Q signals, and fine control of frequency (not shown in FIG. 2) possibly applied from the demodulator 14 to the local oscillator 24 is disconnected or frozen.

If FSK-type modulation is used, a DC voltage is applied to the mixer 22 as the I and Q signals, and the frequency of the local oscillator is modulated by a voltage Vm obtained from the modulator. For this period of time, an AFC voltage possibly obtained from the demodulator to the local oscillator 24 is disconnected (or frozen).

Combining FSK-type modulation with the above-described system constitutes the preferred embodiment of the invention, at least economically. This is because the maximum undistorted output power will be obtained in this way, in addition to which the demodulator can be implemented by using a circuit arrangement based on measuring differences between the direction angles of consecutive displacements that have occurred in the I/Q plane of the signal point. This demodulator solution, which is interference-resistant and advantageous in costs, is described more fully in Finnish Patent Application FI 932 519, which is referred to for a more detailed description.

In principle, the mixer 22 can be any known (passive, quadrature) mixer structure. However, in order that the mixer 22 would not cause any needless attenuation at the transmission stage, the mixer is implemented according to the preferred embodiment of the invention by switching it for the duration of the transmission period into a state where its conversion loss is at its minimum. In this kind of alternative, the quadrature mixer may be, e.g., a mixer realized by FETs and controlled so that it will act as an active mixer at the transmission stage and as a passive mixer at the reception stage.

Figure 3:
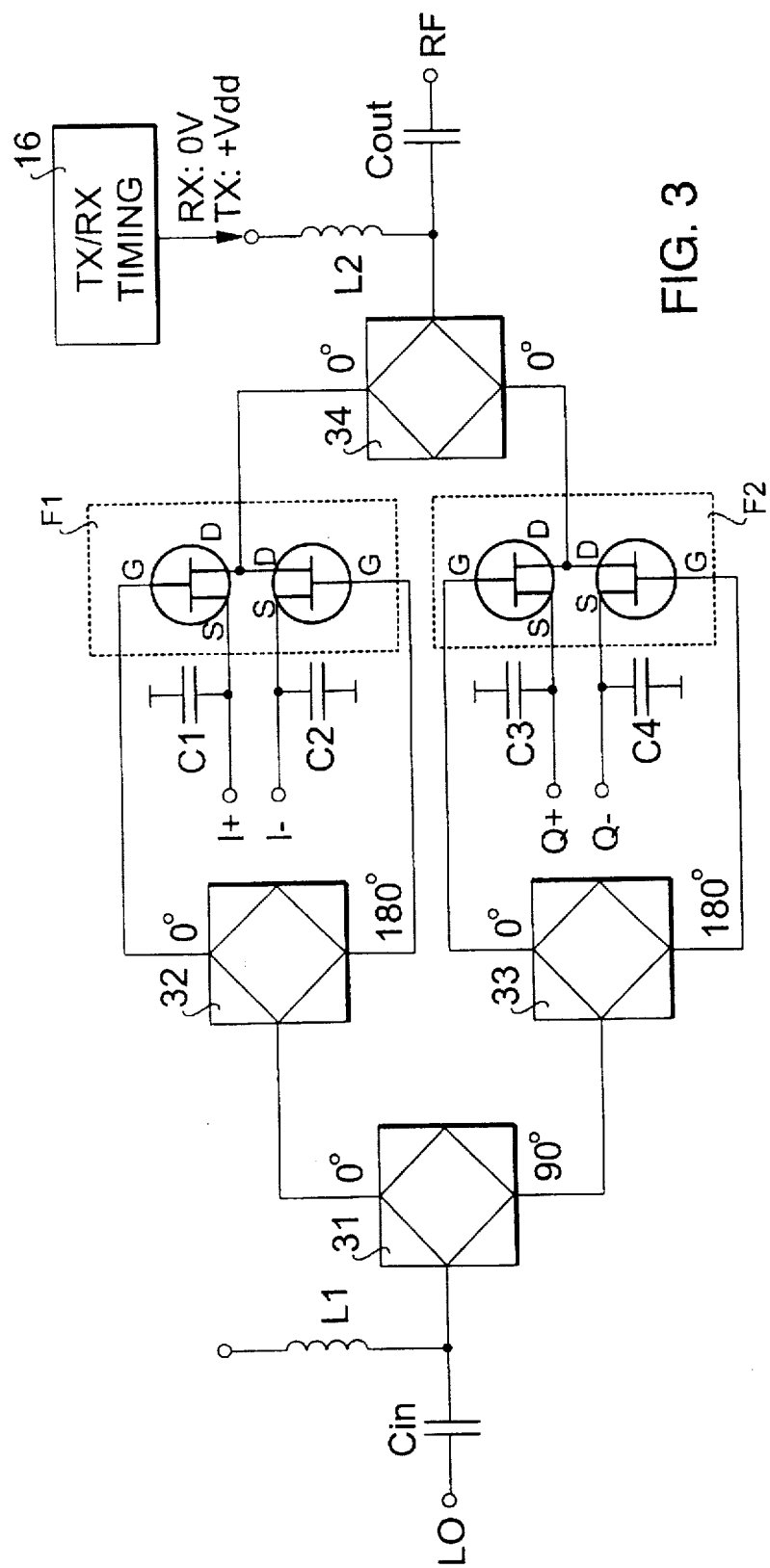
FIG. 3 is a more detailed view of a quadrature mixer according to the invention.

FIG. 3 shows this kind of passive/active mixer, which, in principle, comprises two separate mixer blocks controlled at the different phases. The local oscillator signal LO is applied through an input capacitor Cin to a first power divider 31, from which it is further divided as such (with the same phase) to a second power divider 32, and with a phase shift of 90 degrees to a third power divider 33. The second and third power dividers each control their own FET block F1 and F2, respectively, which are mutually similar, so that the port of the respective power divider corresponding to the phase shift of 0° is connected to the gate of the first FET, and the port corresponding to the phase shift of 180° to the gate of the second FET. The first FET block F1 forms the terminals of the I signal, so that the source electrode S of the first FET forms the I+ terminal of the signal, and the source electrode S of the second FET forms the I− terminal of the signal. (Signal I− is equal to inverted signal I+.) Correspondingly, the second FET block F2 forms the terminals of the Q signal, so that the source electrode S of the first FET forms the Q+ terminal of the signal, and the source electrode S of the second FET forms the Q– terminal of the signal. (Signal Q– is equal to inverted signal Q+. It is also to be mentioned that the signals I+ and I– are indicated in FIG. 2 with the same reference, I, and the signals Q+ and Q– with the same reference, Q.) In both of the blocks, the RF-ground is formed for the source electrode of the respective FET by means of the capacitors C1, C2 and C3, C4, respectively. In both of the FET blocks, the drain electrodes of the FETs are interconnected, and this common terminal is connected to a fourth power divider 34, which combines the mixed signals and applies them through an output capacitor Cout and the RF port of the mixer to the antenna and, respectively, divides the signal to the mixer blocks in the reception. In principle, the fourth power divider is not absolutely necessary in the mixer.

According to the preferred embodiment of the invention, this mixer structure, known per se, is utilized in such a way that the timing means 16 determining the transmission/reception alternation controls the mixer by connecting a bias voltage +Vdd to the drain electrodes of the FETs through a choke L2 and the fourth power divider 34 at the transmission stage, so that the FETs act as active (amplifying) mixers. Upon transition to the reception stage, the timing means 16 determining the transmission/reception alternation disconnects the bias voltage, and so the FETs act alternately as conductive switches, and the mixer acts as a passive mixer. Through a choke L1, a bias voltage is applied to the gates of the FETs; this voltage is continuously on (during both transmission and reception).

The mixer structure shown in FIG. 3 is advantageous in the sense that it operates in both directions and it can be easily used as active in the transmission direction, which is particularly advantageous, as the link terminal according to the invention has no separate amplifiers on the RF side.

When an FSK-type signal is used, attenuation caused by the mixer can also be prevented by providing the mixer block with a switch which switches the mixer for the duration of the transmission into a state in which the local oscillator signal passes directly through the mixer at the greatest possible power. Even in this case, the timing means 16 determining the transmission/reception alternation controls the state of the mixer.

Even though the invention has been described above with reference to the examples of the attached drawings, it is obvious that the invention is not limited to it, but it can be modified within the inventive idea disclosed above and in the attached claims. The more detailed structure of the equipment will vary in various ways, depending on the modulation method used, for example.

I claim:

1. A digital radio link terminal, comprising:
   baseband modulator means in a transmitting branch, said baseband modulator means being arranged for generating baseband modulation signals from a digital data stream;
   demodulator means in a receiving branch, said demodulator means being arranged for generating a baseband data stream by demodulating baseband signals to be received; and
   frequency-conversion means comprising a single common quadrature mixer and a local oscillator controlling said single common quadrature mixer, said frequency-conversion means being arranged for forming an RF transmitting signal directly from said baseband modulation signals and for forming said baseband signals to be received directly from an RF signal to be received, such that said transmitting and receiving branches are separated at the baseband.

2. The radio link terminal according to claim 1, wherein:
   said baseband modulator means comprises an FSK modulator;
   said mixer is arranged to have DC-voltage signals applied thereto as quadrature signals; and
   said local oscillator is arranged to have the frequency thereof modulated by a voltage obtained from said baseband modulator means.

3. The radio link terminal according to claim 1, wherein:
   said baseband modulator means comprises an FSK modulator; and
   further comprising a timing means arranged to switch said mixer for the duration of each transmission into a state in which the signal of said local oscillator passes directly through said mixer.

4. A digital radio link system, comprising:
   two radio link terminals establishing a fixed radio connection between them, said radio link terminals being arranged to transmit alternately at the same radio frequency;
   each of said radio link terminals comprising:
      baseband modulator means in a transmitting branch, said baseband modulator means being arranged for generating baseband modulation signals from a digital data stream;
      demodulator means in a receiving branch, said demodulator means being arranged for generating a baseband data stream by demodulating baseband signals to be received; and
      frequency-conversion means comprising a single common quadrature mixer and a local oscillator controlling said single common quadrature mixer, said frequency-conversion means being arranged for forming an RF transmitting signal directly from said baseband modulation signals and for forming said baseband signals to be received directly from an RF signal to be received, such that said transmitting and receiving branches are separated at the baseband; and
   timing means arranged for converting the respective said radio link terminals alternately to a transmitting and receiving mode such that when one of said radio link terminals is in a transmitting mode, the other of said radio link terminals is in a receiving mode and vice versa.

5. The radio link system according to claim 4, wherein:
   said baseband modulator means is arranged to use FSK modulation;
   said mixer is arranged to have DC-voltage signals thereto as quadrature signals; and
   said local oscillator is arranged to have the frequency thereof modulated by a voltage obtained from said baseband modulator means.

6. The radio link system according to claim 4, wherein:
   said baseband modulator means is arranged to use FSK modulation;
   said timing means is arranged to switch said mixer for the duration of each transmission into a state in which the signal of said local oscillator passes directly through said mixer.

7. A digital radio link terminal, comprising:
   baseband modulator means in a transmitting branch, said backband modulator means being arranged for generating baseband modulation signals from a digital data stream;

demodulator means in a receiving branch, said demodulator means being arranged for generating a baseband data stream by demodulating baseband signals to be received;

frequency-conversion means comprising a single common quadrature mixer and a local oscillator controlling said single common quadrature mixer, said frequency-conversion means being arranged from forming an RF transmitting signal directly from said baseband modulation signals and for forming said baseband signals to be received directly from an RF signal to be received, such that said transmitting and receiving branches are separated at the baseband; and timing means arranged for converting the radio link terminal alternately to a transmitting mode and receiving mode such that transmission and reception take place at different times;

said single common quadrature mixer being arranged to operate under the control of said timing means alternatively in an active mixing state for the duration of each transmission period and in a passive mixing state for the duration of each reception period.

8. A digital radio link system, comprising:

two radio link terminals establishing a fixed radio connection between them, said radio link terminals being arranged to transmit alternately at the same radio frequency;

each of said radio link terminals comprising:

baseband modulator means in a transmitting branch, said baseband modulator means being arranged for generating baseband modulation signals from a digital data stream;

demodulator means in a receiving branch, said demodulator means being arranged for generating a baseband data stream by demodulating baseband signals to be received; and frequency-conversion means comprising a single common quadrature mixer and a local oscillator controlling said single common quadrature mixer, said frequency-conversion means being arranged for forming an RF transmitting signal directly from said baseband modulation signals and for forming said baseband signals to be received directly from an RF signal to be received, such that said transmitting and receiving branches are separated at the baseband; and timing means arranged for converting the respective said radio link terminals alternately to a transmitting and receiving mode such that when one of said radio link terminals is in a transmitting mode, the other of said radio link terminals is in a receiving mode and vice versa;

said single common quadrature mixer being arranged to operate under the control of said timing means alternately in an active mixing state for the duration of each transmission period and in a passive mixing state for the duration of each reception period.

* * * * *